United States Patent
Ayrapetian et al.

(10) Patent No.: US 9,472,203 B1
(45) Date of Patent: Oct. 18, 2016

(54) CLOCK SYNCHRONIZATION FOR MULTICHANNEL SYSTEM

(71) Applicant: Amazon Technologies, Inc., Seattle, WA (US)

(72) Inventors: Robert Ayrapetian, Morgan Hill, CA (US); Arnaud Jean-Louis Charton, Livermore, CA (US); Yuwen Su, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/753,979

(22) Filed: Jun. 29, 2015

(51) Int. Cl.
| | |
|---|---|
| *H04B 3/20* | (2006.01) |
| *G10L 21/0208* | (2013.01) |
| *H04R 3/02* | (2006.01) |
| *G10K 11/16* | (2006.01) |
| *H04R 3/12* | (2006.01) |

(52) U.S. Cl.
CPC ........... *G10L 21/0208* (2013.01); *G10K 11/16* (2013.01); *H04R 3/02* (2013.01); *H04R 3/12* (2013.01); *G10L 2021/02082* (2013.01); *H04R 2420/07* (2013.01)

(58) Field of Classification Search
CPC .......................... G10L 21/0208; H04M 9/082
See application file for complete search history.

(56) References Cited

U.S. PATENT DOCUMENTS

| | | | |
|---|---|---|---|
| 6,421,443 B1 | 7/2002 | Moore et al. | |
| 2005/0089148 A1* | 4/2005 | Stokes, III | H04M 9/082 379/3 |
| 2010/0303228 A1* | 12/2010 | Zeng | H04M 9/082 379/406.08 |
| 2014/0112466 A1* | 4/2014 | Bao | H04M 9/082 379/406.06 |

OTHER PUBLICATIONS

Ahgren. Acoustic Echo Cancellation and Doubletalk Detection Using Estimated Loudspeaker Impulse Responses. Speech and Audio Processing, IEEE Transactions on 13, No. 6, pp: 1231-1237, 2005.
Cheung. Tap Leakage Applied to Echo Cancellation. PhD diss., McGill University, Montreal, 1985.
Murano, et al. Echo Cancellation and Applications. Communications Magazine, IEEE 28, No. 1, pp: 49-55, 1990.
Qi. Acoustic Echo Cancellation Algorithms and Implementation on the TMS320C8x. Texas Instruments Application Report. Digital Signal Processing Solutions. May 1996.
Sondhi, et al. Stereophonic Acoustic Echo Cancellation—An Overview of the Fundamental Problem. Signal Processing Letters, IEEE 2, No. 8, pp. 148-151, 1995.

* cited by examiner

*Primary Examiner* — Simon King
(74) *Attorney, Agent, or Firm* — Seyfarth Shaw LLP; Ilan N. Barzilay; David A. Klein

(57) ABSTRACT

An acoustic echo cancellation (AEC) system that detects and compensates for differences in sample rates between the AEC system and a set of wireless speakers based on a search-based trial-and-error technique. The system individually determines a frequency offset for each microphone-speaker pair using an iterative process, determining an echo-return loss enhancement (ERLE) value for each offset that is tried, and selecting the frequency offset associated with the largest ERLE value.

20 Claims, 5 Drawing Sheets

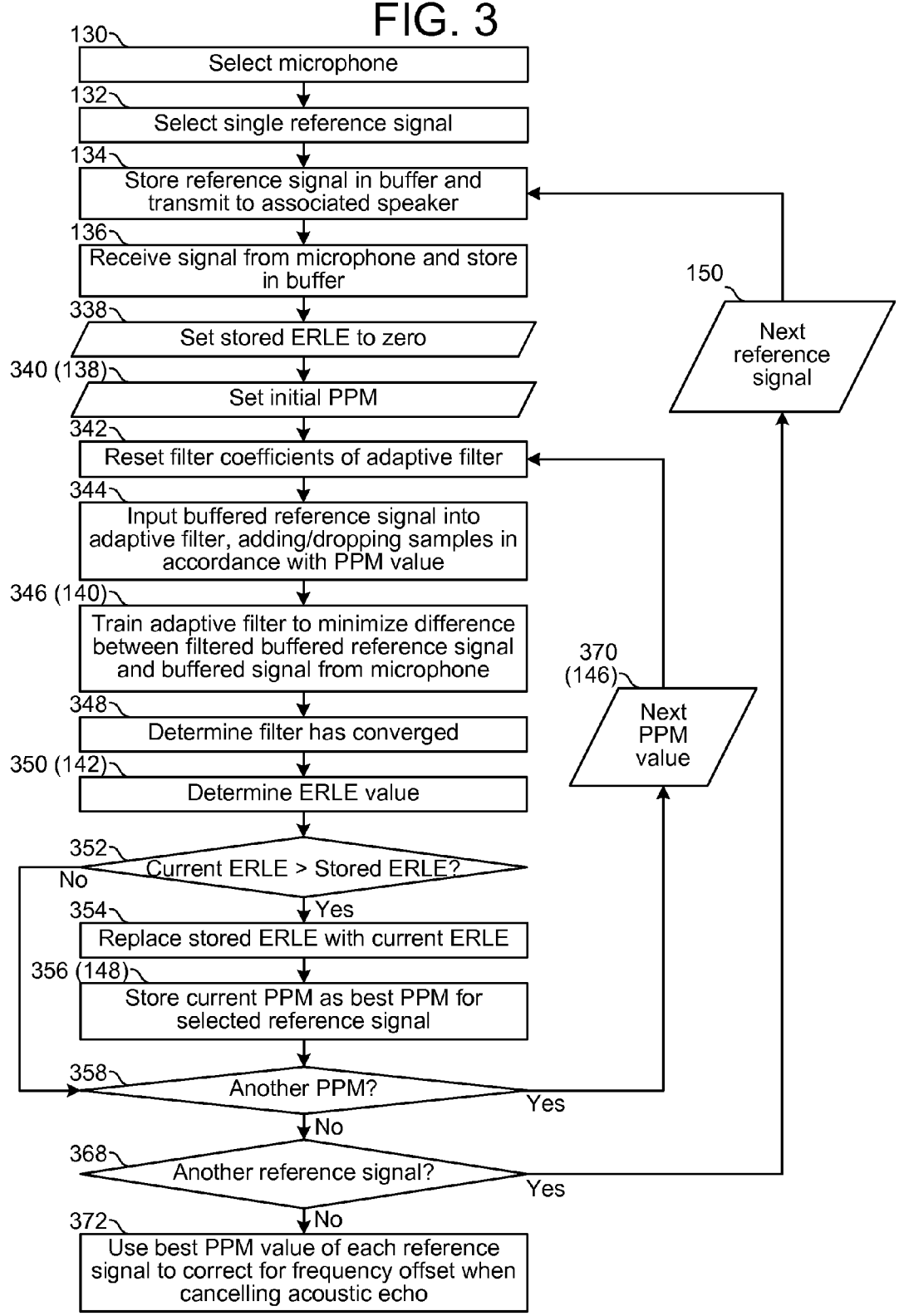

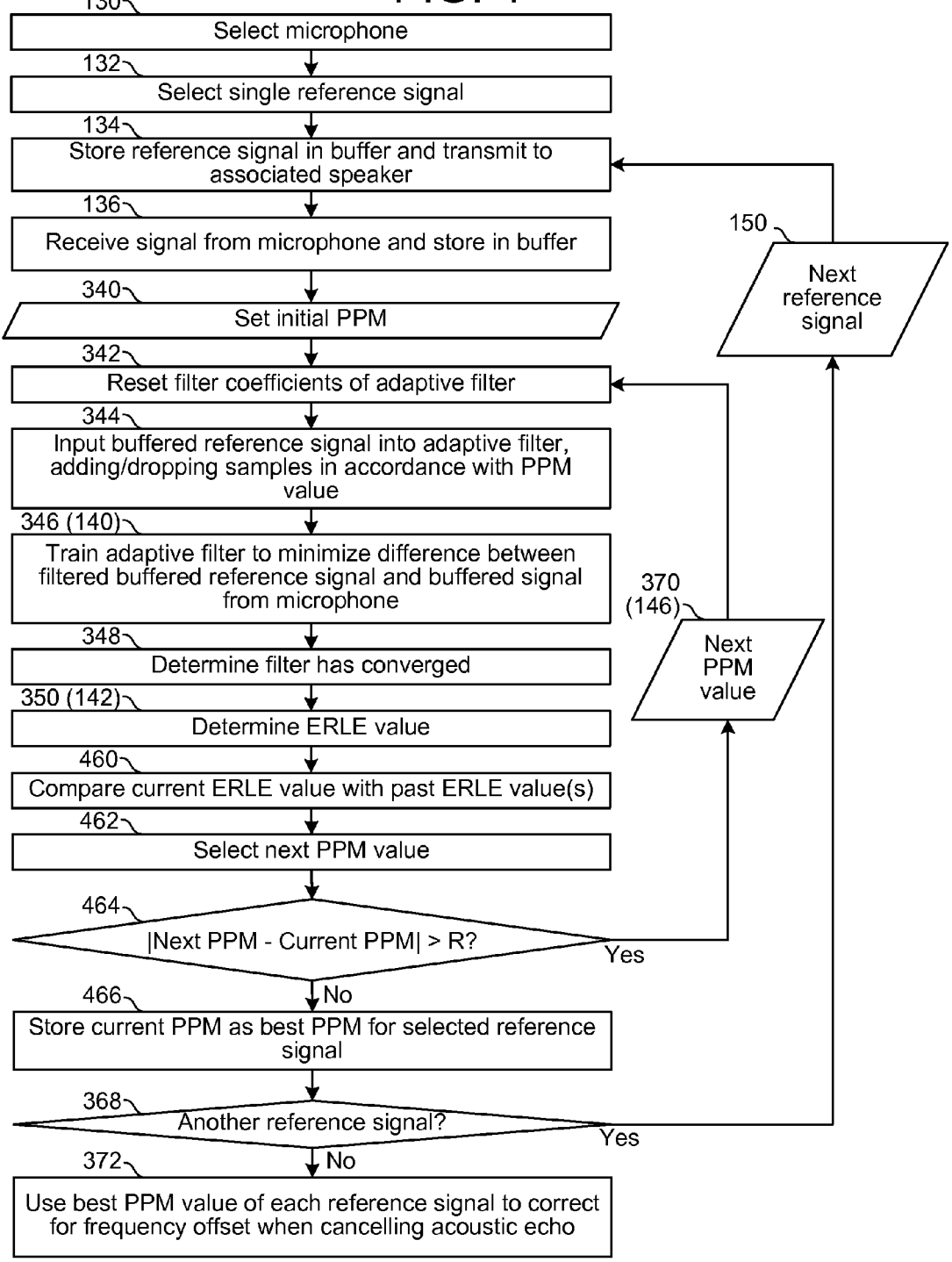

CLOCK SYNCHRONIZATION FOR MULTICHANNEL SYSTEM

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIGS. 3 and 4 illustrate examples of the process for initially calibrating the echo cancellation system.

DETAILED DESCRIPTION

Figure 1:
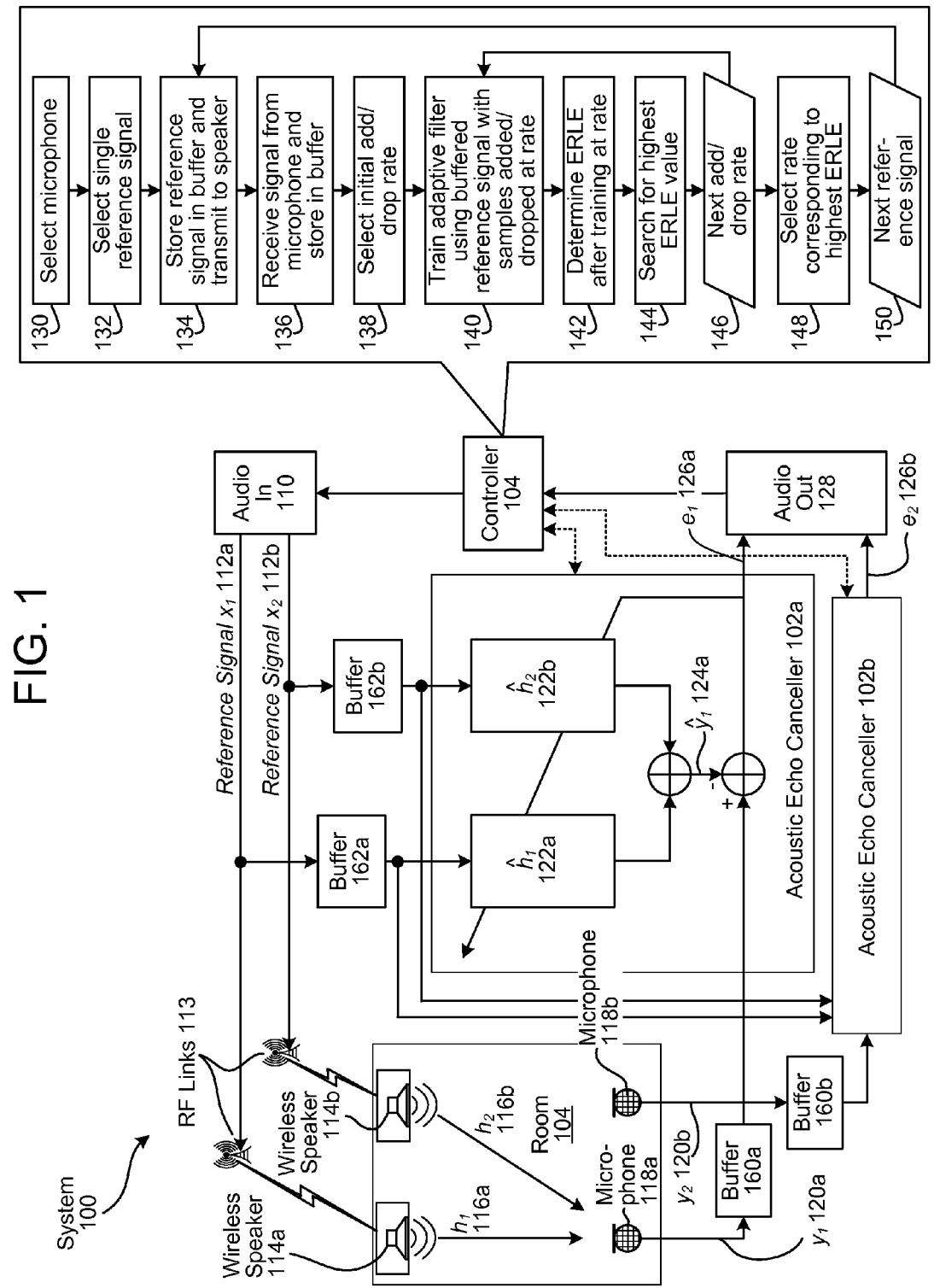
FIG. 1 illustrates an echo cancellation system that compensates for frequency offsets caused by differences in sampling rates.

Many electronic devices operate based on a timing "clock" signal produced by a crystal oscillator. For example, when a computer is described as operating at 2 GHz, the 2 GHz refers to the frequency of the computer's clock. This clock signal can be thought of as the basis for an electronic device's "perception" of time. Specifically, a synchronous electronic device may time its own operations based on cycles of its own clock. If there is a difference between otherwise identical devices' clocks, these differences can result in some devices operating faster or slower than others.

In stereo and multi-channel audio systems that include wireless or network-connected loudspeakers and/or microphones, a major cause of problems for conventional AEC is when there is a difference in clock synchronization between loudspeakers and microphones. For example, in a wireless "surround sound" 5.1 system comprising six wireless loudspeakers that each receive an audio signal from a surround-sound receiver, the receiver and each loudspeaker has its own crystal oscillator which provides the respective component with an independent "clock" signal.

Among other things that the clock signals are used for is converting analog audio signals into digital audio signals ("A/D conversion") and converting digital audio signals into analog audio signals ("D/A conversion"). Such conversions are commonplace in audio systems, such as when a surround-sound receiver performs A/D conversion prior to transmitting audio to a wireless loudspeaker, and when the loudspeaker performs D/A conversion on the received signal to recreate an analog signal. The loudspeaker produces audible sound by driving a "voice coil" with an amplified version of the analog signal.

A problem for an AEC system occurs when the audio that the surround-sound receiver transmits to a speaker is output at a subtly different "sampling" rate by the loudspeaker. When the AEC system attempts to remove the audio output by the loudspeaker from audio captured by the system's microphone(s) by subtracting a delayed version of the originally transmitted audio, the playback rate of the audio captured by the microphone is subtly different than the audio that had been sent to the loudspeaker.

For example, consider loudspeakers built for use in a surround-sound system that transfers audio data using a 48 kHz sampling rate (i.e., 48,000 digital samples per second). An actual rate based on a first component's clock signal might actually be 48,000.001 samples per second, whereas another component might operate at an actual rate of 48,000.002 samples per second. This difference of 0.001 samples per second between actual frequencies is referred to as a frequency "offset." The consequences of a frequency offset is an accumulated "drift" in the timing between the components over time. Uncorrected, after one-thousand seconds, the accumulated drift is an entire cycle of difference between components.

In practice, each loudspeaker in a multi-channel audio system may have a different frequency offset to the surround sound receiver, and the loudspeakers may have different frequency offsets relative to each other. If the microphone(s) are also wireless or network-connected to the AEC system (e.g., a microphone on a wireless headset), any frequency offset between the microphone(s) and the AEC system may also contribute to the accumulated drift between the captured reproduced audio signal(s) and the captured audio signals(s).

FIG. 1 illustrates a high-level conceptual block diagram of echo-cancellation aspects of a multi-channel AEC system 100. As illustrated, an audio input 110 provides stereo audio "reference" signals $x_1(k)$ 112$a$ and $x_2(k)$ 112$b$. The reference signal 112$a$ is transmitted to a speaker 114$a$, and the reference signal 112$b$ is transmitted to a speaker 114$b$. Each speaker outputs the received audio, and portions of the output sounds are captured by a pair of microphone 118$a$ and 118$b$.

The portion of the sounds output by each of the loudspeakers that reaches each of the microphones 118$a$/118$b$ can be characterized based on transfer functions. FIG. 1 illustrates transfer functions $h_1(k)$ 116$a$ and $h_2(k)$ 116$b$ between the loudspeakers 114$a$ and 114$b$ (respectively) and the microphone 118$a$. The transfer functions vary with the relative positions of the components and the acoustics of the room 104. If the position of all of the objects in a room 104 are static, the transfer functions are likewise static. Conversely, if the position of an object in the room 104 changes, the transfer functions may change.

The transfer functions (e.g., 116$a$, 116$b$) characterize the acoustic "impulse response" of the room 104 relative to the individual components. The impulse response, or impulse response function, of the room 104 characterizes the signal from a microphone when presented with a brief input signal (e.g., an audible noise), called an impulse. The impulse response describes the reaction of the system as a function of time. If the impulse response between each of the loudspeakers 116a/116b is known, and the content of the reference signals $x_1(k)$ 112a and $x_2(k)$ 112b output by the loudspeakers is known, then the transfer functions 116a and 116b can be used to estimate the actual loudspeaker-reproduced sounds that will be received by a microphone (in this case, microphone 118a). The microphone 118a converts the captured sounds into a signal $y_1(k)$ 120a. A second set of transfer functions is associated with the other microphone 118b, which converts captured sounds into a signal $y_2(k)$ 120b.

The "echo" signal $y_1(k)$ 120a contains some of the reproduced sounds from the reference signals $x_1(k)$ 112a and $x_2(k)$ 112b, in addition to any additional sounds picked up in the room 104. The echo signal $y_1(k)$ 120a can be expressed as:

$$y_1(k) = h_1(k)*x_1(k) + h_2(k)*x_2(k) \quad [1]$$

where $h_1(k)$ 116a and $h_2(k)$ 116b are the loudspeaker-to-microphone impulse responses in the receiving room 104, $x_1(k)$ 112a and $x_2(k)$ 112b are the loudspeaker reference signals, * denotes a mathematical convolution, and "k" is an audio sample.

The acoustic echo canceller 102a calculates estimated transfer functions $\hat{h}_1(k)$ 122a and $\hat{h}_2(k)$ 122b. These estimated transfer functions produce an estimated echo signal $\hat{y}_1(k)$ 124a corresponding to an estimate of the echo component in the echo signal $y_1(k)$ 120a. The estimated echo signal can be expressed as:

$$\hat{y}_1(k) = \hat{h}_1(k)*x_1(k) + \hat{h}_2(k)*x_2(k) \quad [2]$$

where * again denotes convolution. Subtracting the estimated echo signal 124a from the echo signal 120a produces the error signal $e_1(k)$ 126a, which together with the error signal $e_2(k)$ 126b for the other channel, serves as the output (i.e., audio output 128). Specifically:

$$\hat{e}_1(k) = y_1(k) - \hat{y}_1(k) \quad [3]$$

The acoustic echo canceller 102a calculates estimated transfer functions $\hat{h}_1(k)$ 122a and $\hat{h}_2(k)$ 122b using adaptive filter coefficients. In conventional AEC systems, the adaptive filter coefficients are derived using least mean squares (LMS) or stochastic gradient algorithms, which use an instantaneous estimate of a gradient to update an adaptive weight vector at each time step. With this notation, the LMS algorithm can be iteratively expressed in the usual form:

$$\hat{h}_{new} = \hat{h}_{old} + \mu * e * x \quad [4]$$

where $h_{new}$ is an updated transfer function, $h_{old}$ is a transfer function from a prior iteration, $\mu$ is the step size between samples, e is an error signal, and x is a reference signal.

Applying such adaptation over time (i.e., over a series of samples), it follows that the error signal "e" should eventually converge to zero for a suitable choice of the step size $\mu$ (assuming that the sounds captured by the microphone 118a correspond to sound entirely based on the references signals 112a and 112b rather than additional ambient noises, such that the estimated echo signal $\hat{y}_1(k)$ 124a cancels out the echo signal $y_1(k)$ 120a). However, e→0 does not always imply that the actual transfer function h minus the estimated transfer function $\hat{h}$ converges to zero, which is the primary goal of the adaptive filter. For example, the estimated transfer functions $\hat{h}$ may cancel a particular sample or string of samples due to the repetitious nature of audio data, such that the error signal e becomes zero, but in fact may be out of synchronization with the transfer function h, such that the cancellation may be intermittent or transitory. Requiring that the estimated transfer function $\hat{h}$ converges toward equaling the actual transfer function h is the goal of single-channel echo cancellation, and becomes even more critical in the case of multichannel echo cancellers that require estimation of multiple transfer functions.

While drift accumulates over time, the need for multiple estimated transfer functions $\hat{h}$ in multichannel echo cancellers accelerates the mismatch between the echo signal y from a microphone and the estimated echo signal $\hat{y}$ from the echo canceller. To mitigate and eliminate drift, it is therefore necessary to estimate the frequency offset for each channel, so that each estimated transfer function $\hat{h}$ can compensate for difference in component clocks. Many components, however, do not provide accurate clocking information to each other, such that the clocking of components such as wireless microphones and speakers will be unknown to the echo canceller.

The relative frequency offset can be defined in terms of "ppm" (parts-per-million) error between components. The normalized sampling clock frequency offset (error) is a normalized ratio defined as:

$$PPM \text{ error} = \frac{Ftx}{Frx} - 1 \quad [5]$$

For example, if a loudspeaker (transmitter) sampling frequency Ftx is 48,000 Hz and a microphone (receiver) sampling frequency Frx is 48,001 Hz, then the frequency offset between Ftx and Frx is −20.833 ppm. During 1 second, the transmitter and receiver are creating 48,000 and 48,001 samples respectively. Hence, there will be 1 additional sample created at the receiver side during every second.

Figure 2A:
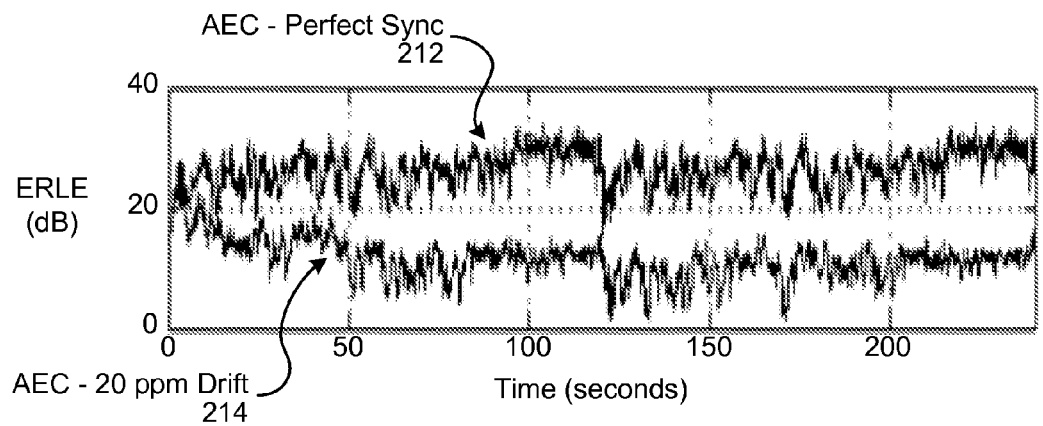
FIGS. 2A to 2C illustrate the reduction in echo-return loss enhancement (ERLE) caused by failing to compensate for frequency offset.
Figure 2B:
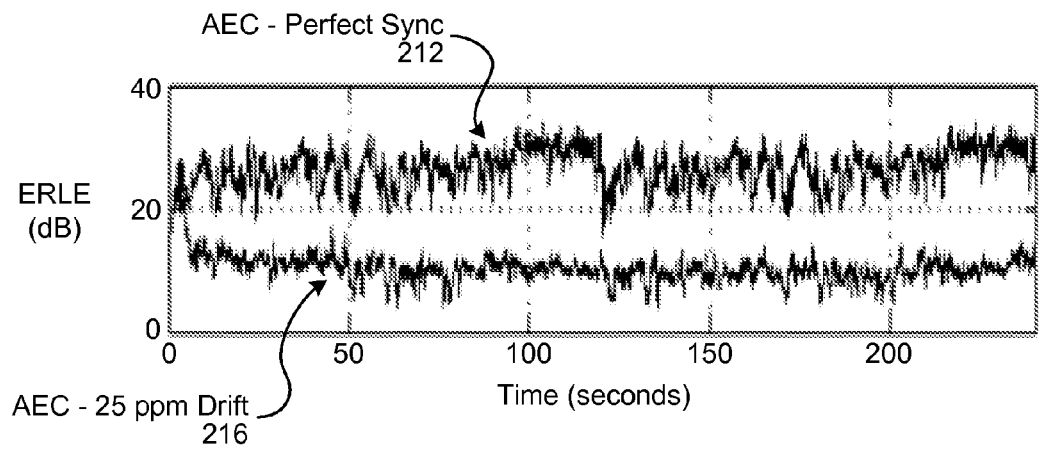
Figure 2C:
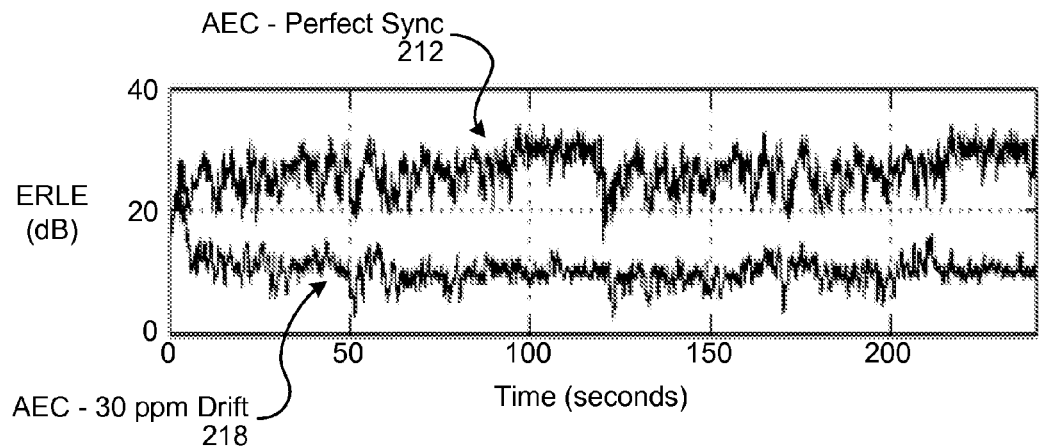

The performance of AEC is measured in ERLE (echo-return loss enhancement). FIGS. 2A, 2B, and 2C are ERLE plots illustrating the performance of conventional AEC with perfect clock synchronization 212 and with 20 ppm (214), 25 ppm (216) and 30 ppm (218) frequency offsets between the clocks associated with one of the loudspeakers and one of microphones.

As illustrated in FIGS. 2A, 2B, and 2C, if the sampling frequencies of the D/A and A/D converters are not exactly the same, then the AEC performance will be degraded dramatically. The different sampling frequencies in the microphone and loudspeaker path cause a drift of the effective echo path.

For normal audio playback, such differences in frequency offset are usually imperceptible to a human being. However, the frequency offset between the crystal oscillators of the AEC system, the microphones, and the loudspeaker will create major problems for multi-channel AEC convergence (i.e., the error e does not converge toward zero). Specifically, the predictive accuracy of the estimated transfer functions (e.g., $\hat{h}_1(k)$ and $\hat{h}_2(k)$) will rapidly degrade as a predictor of the actual transfer functions (e.g., $h_1(k)$ and $h_2(k)$).

For the purpose of explanation, consider a system that includes "M" loudspeakers 114 (M>1) and a separate microphone array system (microphones 118) for hands free near-end/far-end multichannel AEC applications. The frequency offsets for each loudspeaker and the microphone array can be characterized as df1, df2, . . . , dfM. Existing and well known solutions for frequency offset correction for LTE (Long Term Evolution cellular telephony) and WiFi (free running oscillators) are based on Fractional Delayed Interpolator methods. Fractional delay interpolator methods provide accurate correction with additional computational cost. Accurate correction is required for high speed communication systems.

However, audio applications are not high speed and relatively simple frequency correction algorithm may be applied, such as a sample add/drop method. Hence, if playback of reference signals $x_1$ 112(a) (corresponding to loudspeaker 114a) is signal 1, and the frequency offset between signal 1 and the microphone output signal $y_1$ 120a is dfk, then frequency correction may be performed by dropping/adding one sample in 1/dfk samples.

A communications protocol-specific solution to this problem would be to embed a sinusoidal pilot signal when transmitting reference signals "x" and receiving echo signals "y." Using a phase-locked loop (PLL) circuit, components can synchronize their clocks to the pilot signal, and/or estimate the frequency error. However, that requires that the communications protocol between components and each component to support use of such pilot. While such a protocol might be efficient in a closed proprietary system, it would not work in an open framework using off-the-shelf components (e.g., generic Bluetooth wireless loudspeaker).

Another alternative is to transmit an audible sinusoidal signal with the reference signals x. Such a solution does not require a specialize communications protocol, nor any particular support from components such as the loudspeakers and microphones. However, the audible signal will be heard by users, which might be acceptable during a startup or calibration cycle, but is undesirable during normal operations. Further, if limited to startup or calibration, any information gleaned as to frequency offsets will be static, such that the system will be unable to detect and compensate for offset changes over time (e.g., due to thermal changes within a component altering frequency of the component's clock).

Another alternative is to transmit an ultrasonic sinusoidal signal with the reference signals $x_m$ (m=1 to M, where M is the number of loudspeakers) at a frequency that is outside the range of frequencies human beings can perceive. A first shortcoming of this approach is that it requires loudspeakers and microphones to each be capable of operating at the ultrasonic frequency. Another shortcoming is that the ultrasonic signal will create a constant sound "pressure" on the microphones, potentially reducing the microphones' sensitivity in the audible parts of the spectrum.

To address these shortcomings of the conventional solutions, the acoustic echo cancellers 102a and 102b in FIG. 1 adapt the filter coefficients of the adaptive filters to approximate the estimated transfer functions $\hat{h}_1(k)$ 122a and $\hat{h}_2(k)$ 122b to correct for the frequency offsets between components based entirely on the transmitted and received audio signals (e.g., x(k) 112, y(k) 120). No pilot signals are needed, and no additional signals need to be embedded in the audio. Compensation may be performed by adding or dropping samples to eliminate the ppm offset, dropping or adding one sample in 1/dfk samples From definition of the PPM error in Equation 5, if the frequency offset is "dfk" ppm, then in 1/dfk samples, one additional sample will be added. Hence, if difference is 1 ppm, then one additional sample will be created in $1/1e\text{-}6=10^6$ samples; if the difference is 20.833 ppm, then one additional sample will be added for every 48,000 samples; and so on. The sample that is added may be, for example, may a duplicate copy of the last of the 48,000 samples (i.e., repeating the last sample in the block determined based on the PPM value "dfk"). If the difference is −1 ppm, then one sample such as the last sample of $1/1e\text{-}6=10^6$ samples will be dropped (i.e., not input into the adaptive filter 122); and so on.

The process, which is managed by a controller 104, begins with a training sequence when the system 100 is initially powered ON. The frequency offset is individually determined sequentially for each of the M channels or loudspeakers. Initially, a single microphone (130) is selected. When the analog-to-digital (converters) associated with the array of microphones 118 are all drive by a common clock signal, it is sufficient to use a single microphone 118 for all training, as the frequency offset between any particular speaker 114 and all of the microphones will be the same. If each microphone 118 is associated with a different clock signal, then the process illustrated in FIG. 1 would be repeated for each microphone, but for the purpose of explanation, it is assumed that each wireless speaker 114 has its own independent clock, but the microphones 118 share a common clock.

Having selected (130), a single reference signal "x" is selected (132). The output reference signal(s) may comprises a set of defined system start-up sounds, or may be arbitrarily signals conveying audible sounds. Preferably, the reference signals have a frequency distribution that spans much of the audible spectrum to provide a robust characterization of microphone-speaker coupling acoustics. When one reference signal is selected (132), the other reference signals may be blocked or cut off.

A plurality of samples spanning an pre-determined interval of the selected reference signal is stored (134) in a buffer 162. The selected reference signal is also transmitted to the corresponding wireless speaker 114 via a radio frequency (RF) link 113, infrared, or other wireless protocol. The buffered interval may be, for example, five to 15 seconds at a defined sampling rate of the reference signal 112, which is also used for sampling by the A/D converters of the microphone array 118, and is ostensibly used the digital-to-analog (D/A) converter wireless speaker 114 to reproduce the audible sounds.

A portion of the audible sound reproduced by the wireless speaker 114 receiving the selected reference signal is captured by the selected microphone 118. The A/D converter associated with the microphone 118 (not illustrated) outputs a signal "y" 120 at the defined sampling rate, which is received and stored (136) in a buffer 160.

After buffering both the reference signal 112 and the microphone signal The system then trains the adaptive filter 122 associated with the reference signal 112 by repetitively inputting the stored reference signal introducing varying amounts of frequency offset into the reproduced reference signal by adding or dropping samples from the reproduced reference signal at a selected rate, searching for add/drop rate that produces the best (largest) echo return loss enhancement (ERLE) when the filtered reference signal output by the adaptive filter 122 is subtracted from the reproduced signal from the microphone 118 stored in the buffer 160.

The controller 104 selects (138) an initial add/drop rate, such as by selecting a PPM value and then adding or dropping samples from the buffered reference signal prior to inputting the buffered reference signal into the adaptive filter 122. So, for example, selecting an offset of +10 ppm would correspond to an "add" rate of one sample per $1/(10*10^{-6})$ samples, where the sample added may be a duplicate of the last sample of each block of 10 million buffered samples. Likewise, selecting an offset of −10 ppm would correspond to an "drop" rate of one sample per $1/(10*10^{-6})$ samples, where the sample dropped may be the last sample of each block of 10 million buffered samples.

Common audio systems crystal isolators in audio components vary in range by −20 ppm to +20 ppm. If both the microphones and loudspeakers are wireless, then the maximum frequency offsets between the loudspeakers and the microphone array would be +/−40 ppm. Whatever range is selected should be wider than the anticipated worst-case frequency offset expected to occur in a system. To account for this range, samples may be added or subtracted to the buffered reference signal at a rate of one sample per 1/dfk samples.

The buffered reference signal with samples added/dropped based on the initial selected rate are input into the adaptive filter 122, training (140) the adaptive filter 122 to cancel the reproduced microphone signal from buffer 160. After the filter is trained, the controller determines (142) an echo return loss enhancement (ERLE) value for the respective sample add/drop rate. A larger ERLE value indicates better performance than a smaller ERLE value. The ERLE is a measure of how effectively the adaptive filter 122 cancels the portion of the reference signal reproduced by the speaker 114, captured by the microphone 118, and stored in the buffered signal from the microphone.

The controller 104 choose a next add/drop rate (146) and retrains (140) the adaptive filter for the next add drop rate, searching (144) for the largest/best ERLE value. This process may be repeated several times. As will be described further in connection with FIG. 3, the controller may step through a fixed series of add/drop PPM values, determining the ERLE after each iteration of training while searching (146) for the best ERLE, or may store all of the resulting ERLEs and their associated PPM, searching the stored values once adaptive filter has been retrained for all of the PPMs. For example, the controller 104 may train and retrain the adaptive filter add/drop rates spanning −40 ppm to +40 ppm in steps/increments of 10 ppm. In the alternative, as will be further described in connection with FIG. 4, a search algorithm may choose the next PPM value based on trends in the resulting ERLE results (i.e., whether the ERLE results are improving or declining).

The controller 104 selects the add/drop rate corresponding to the highest ERLE value produced by the search, and stores it for use with the reference signal 112 and corresponding wireless speaker 114. If there is another reference signal 112 to test, the controller 104 selects the next reference signal and repeats the process, returning back to storing (134) the reference signal in the buffer and transmitting the chose signal to the corresponding wireless speaker 114. When the training process is complete and the system 100 is used with arbitrary reference signals, the controller 104 bypasses the buffers 160, passing the signals 120 directly from microphones 120 (or more specifically, the A/D converter associated with each microphone) to their correspond AEC 102, and used the stored add/drop rate determined for each reference signal to eliminate the frequency offset between the speakers' timing clocks and that of the microphones 118.

As a matter of definition, although training is described in terms of "add" and "drop" rates, it should be understand that zero ppm is included within the range of possible add/drop rates, such that the add/drop rates include a rate at which no sample is added or dropped the reproduced reference signal input into the adaptive filter 122 during training (140).

Also, the "best" or "highest" ERLE rate may not be the ideal "best" rate, but may be the best rate of the PPM values tested. If the controller 104 is cycling through a series of PPM values, then the "best" rate is the best of the series. If the controller 104 is using a search algorithm to select the next PPM value (which corresponds to the add/drop rate), the value selected as "best" based on criteria such as whether a difference of a current add/drop rate and a next add/drop rate is less than a threshold value (e.g., when the next add/drop rate is less than +/−3 ppm in comparison to the current add/drop rate). A larger the threshold value to determine when to stop the search will result in a faster final result, whereas a smaller threshold value will result in higher precision. However, small estimation errors such as a change of 3 ppm will not significantly decrease performance of the AEC 102.

FIG. 3 illustrates an example of the process where the search in FIG. 1 is performed by stepping through a defined series of add/drop rates, such as stepping through each add-drop rate in a range of −40 ppm to +40 ppm in steps of 10 ppm. FIG. 4 illustrates an example of the process in FIG. 1 where the search dynamically determines which add/drop rates are tested. Only one loudspeaker $K_z$ is playing with corresponding reference signal $x_z$ 112 where z=1 to M, and M is the number of reference signals/loudspeakers. Where a step in FIGS. 3 and 4 is an example of a step illustrated in FIG. 1, the reference number from FIG. 1 is noted in parenthesis in the illustration.

Referring to FIG. 3, the controller 104 selects (130) a microphone 118. This selection may be based on some criteria (e.g., background noise levels relative to other microphones of the array), may be arbitrary, or may be a particular pre-determined microphone. The controller may also routes the output of the A/D converter associated with the selected microphone to a buffer 160, if not already so routed. The controller 104 also selects (132) the single reference signal $x_z$ 112.

The controller 104 stores (134) the selected reference signal $x_z$ 112 in a buffer 162, and transmits the reference signal $x_z$ 112 via the communication link 113 to the associated speaker 114. The speaker 114 reproduces the audio conveyed in the selected reference signal $x_z$ 112, a portion of which is captured by the selected microphone 118. The received signal (after A/D conversion) from the selected microphone is stored in the buffer 160. The buffers 160 and 162 may share a common time index so that when their contents are reproduced during training, the samples of the reproduced signal y 120 and reproduce reference signal $x_z$ 112 reproduce the original timing of transmission (134) and reception (136).

The controller 104 initializes (338) a storage location/data structure where the best ERLE value found by the controller 104 for the selected reference signal $x_z$ 112 will be stored. For example, the controller 104 may initially set the stored ERLE to be zero, which corresponds no echo cancellation (i.e., a bad value for an AEC). The controller 104 also sets an initial PPM value, such as setting dfk to one of the extremes of the range of PPM values (e.g., +40 ppm or −40 ppm). The controller 104 also resets (342) the filter coefficients for the adaptive filter 122 associated with the selected reference signal $x_z$ 112

The controller 104 controllers the buffer 162 to input the buffered reference signal into the adaptive filter, adding or dropping samples in accordance with the selected PPM value "dfk." Specifically, the buffer 162 is controlled to add one sample in 1/dfk samples if the PPM value is positive (where the sample duplicated twice may be, for example, the last sample in every interval, the interval being 1/dfk). Likewise, the buffer 162 is controlled to drop one sample in 1/dfk samples if the PPM value is negative (where the sample dropped may be, for example, the last sample in every 1/dfk interval). For example, if the initial PPM selected by the controller 104 is −40 ppm, then the buffer 162 will be controlled to drop one sample in 1/(40*10⁻⁶) samples.

The adaptive filter 122 is then trained to (140) minimize the difference between the filtered buffered reference signal and the buffered signal from the microphone, with the resulting error signal e 126 fed back into the adaptive filter 122.

Training continues until the controller 104 determines (348) that the filter coefficients of the adaptive filter have converged. The controller 104 may determine (142) that the filter coefficients of the adaptive filter 122 have converged after expiration of a fixed amount of time has transpired. The fixed amount of time may be a pre-programmed value.

In the alternative, the controller 104 may make monitor the progress of the filter 122 to determine (348) convergence. Any technique may be used by the controller 104 to determine (348) filter convergence, which may be approximated (among other ways) based on absolute values of the error signal 126 reaching stable minima. Upon convergence, the filter coefficients of the adaptive filter 122 stabilize to approximately steady state values in the absence of time-varying impulse responses.

An example of a function that may be applied by the controller 104 to the error value e 126 to determine (348) convergence is a peak detection algorithm. One peak-detection based approach to determining convergence calculates the mean square of the energy of the error signal e over a plurality of samples to determine whether a majority of the energy of the error signal e 126 is in a narrow window, such as taking 2048 samples, determining a sum of the squares of the first 300 samples, determining a sum of the squares of all 2048 samples, and then comparing a ratio of the two sums with a threshold value to determine whether a majority of the energy is in a narrow window at and around the initial energy peak. In signal processing the energy $E_S$ of a continuous time-domain signal e(t) is defined as:

$$E_S = \langle e(t), e(t) \rangle = \int_{-\infty}^{\infty} |e(t)|^2 \, dt \quad [6]$$

Another example of a function that may be applied by the controller 104 to the error value e 126 to determine (348) convergence is to take the mean square of the error signal e 126 over a series of samples, divide by the number of samples, and then determine an allowed amount of deviation to determine whether the mean square value indicates a steady-state value. Yet another example of a function that may be applied to the error value e 126 to determine (348) convergence is to apply a signal entropy analysis function to the error signal e 126, determining that there is filter coefficient stability based on entropy. Another example of a function that may be used by the controller 104 to determine (348) convergence is to take the mean of the absolute value of $\hat{h}_{old} - \hat{h}_{new}$ and compare the result to a threshold.

Having determined that the filter 122 is trained based on convergence, the controller 104 determines (350) the ERLE value as an indication of how successful the adaptive filter 122 is at removing the portion of the reference signal captured by the microphone. The controller 104 then compares 352 the current ERLE value with the stored ERLE value to determine whether the current ERLE value is larger (i.e., better) than the stored ERLE value. On the first pass, the current ERLE value will presumably be better than the stored value if the stored value was initialized (338) to zero.

If the current ERLE is larger than the stored ERLE (352 "Yes"), the stored ERLE value is replaced (354) with the current ERLE value, and the current PPM value is stored as the "best" PPM value for the selected reference signal $x_z$ found so far. If there is another PPM value left in the series (e.g., from −40 ppm to +40 ppm in 10 ppm steps/increments) (358 "Yes"), then the controller selects (370) the next PPM value, resets (342) the filter coefficients for the adaptive filter 122, and repeats the filter training process. If the current ERLE is not larger than the stored ERLE (352 "No") and there is another PPM value left in the series (358 "Yes"), then the controller 104 selects (370) the next PPM value, resets (342) the filter coefficients for the adaptive filter 122, and repeats the filter training process.

When all of the PPM values have been tested, the last value stored (354) as the best PPM value for the selected reference signal is saved for use during normal operation of the AECs (e.g., 102a, 102b, etc.). When there are no more PPM values left to test (358 "No"), the controller 104 determines whether there is another reference signal $x_z$ 112 to test. For example, in a 2-channel stereo system, if the left channel reference signal was used for testing first, the right channel reference signal will be selected for testing next. If there is another reference signal to test (368 "Yes"), the controller 104 selects (150) the next reference signal, and repeats the process, storing (134) the next reference signal in the buffer and transmitting the next reference signal to the corresponding speaker 114. When there are no reference signals remaining to be tested (368 "No"), the controller 104 uses the best PPM value found for each reference signal to correct (372) frequency offset when cancelling acoustic echo.

In the process in FIG. 3, instead of searching as-it-goes as illustrated, the controller 104 may determine and store all of the ERLE values for a reference signal, cycling through all of the PPM values, and thereafter perform a search of the stored ERLE values to determine the best ERLE value for that reference signal. Once the best ERLE value is determined, the PPM value that was used to obtain that ERLE value is stored as the best PPM value for that reference signal.

FIG. 4 illustrates an example of the process in FIG. 1 that utilizes a search algorithm to pick the next PPM value. Although any search algorithm may be used to control the search, a preferred search strategy is based on a binary search, as discussed further below.

Within the likely range of PPM values (e.g., −40 ppm to +40 ppm), the best PPM value will have the best (largest) ERLE value, and PPM values to either side of the best PPM values will have lower ERLE values that are inferior (smaller) than the best PPM value. The ERLE values decrease in proportion of the corresponding PPM values to the best value (similar to a Gaussian distribution but not necessarily symmetric).

Thus, a search strategy is to pick three PPM values, and determine whether the resulting ERLEs are increasing in one direction. If the ERLE values do increase in one direction. If the ERLE values do increase in one direction, than the next PPM is chosen in the direction in which the ERLE values increase. This continues until the next PPM results in a decrease in PPM. When a decrease in ERLE occurs, search reverses direction, determining the next PPM in accordance with a sum of the current PPM plus the last PPM divided by two. This back-and-forth process continues until the controller 104 determines the search should stop based on a criteria, such as when the next PPM and the last PPM are less than 3 ppm apart.

Walking through the process in FIG. 4, the first several steps are the same as in FIG. 3. The controller 104 again selects (130) the microphone, selects (132) a single reference signal $x_z$ 112, stores (134) the selected reference signal $x_z$ 112 in a buffer 162 and transmits the selected references signal $x_z$ 112 to the associated speaker, and stores (136) the signal y 120 from the microphone in a buffer 160.

The controller 104 sets (340) an initial PPM value to begin the search, and resets 344 the filter coefficients of the adaptive filter 122. The controller 104 controls the buffer 162 to input (344) the stored reference signal into the adaptive filter 122, adding or dropping samples in accordance with the PPM value. The controller 104 trains (346) the adaptive filter to minimize the difference between the filtered buffered reference signal and the buffered signal from the selected microphone. The controller 104 then determines (348) whether the filter has converged, and determines (350) the ERLE value produced by the trained filter.

From this point, the process diverges from that in FIG. 3, as the search algorithm determines the next PPM. The controller 104 compares (460) the current ERLE value with past ERLE value(s), if any. For example, depending upon the search algorithm used, the controller 104 may compare the last three ERLE results to determine whether the slope of the ERLE relative to PPM indicates that the ERLE values are increase in one direction or the other. The controller 104 then selects (462) the next PPM value. If there are not enough ERLE value yet for the search algorithm, the next PPM value may be selected based on a rule (e.g., add or subtract 10 ppm from the last ppm). When there are sufficient ERLE values for the search algorithm, the controller 104 picks the next PPM value in the +/−ppm direction that the search specified to explore next (e.g., continuing to add or subtract ppm based on rule in the direction of increasing ERLE, or reverse direction such as selecting the next PPM to be the sum of the current PPM and the last PPM divided by two.

The controller then determines (464) whether the absolute value of the difference between the selected next PPM value and the current PPM value is greater than a threshold value "R", such as a threshold value of 3 ppm. If so (464 "Yes"), the selected next PPM value becomes (370) the new "current" PPM value, the filter coefficients are reset (342), and the testing/training process is repeated. If the absolute value of the difference between the selected next PPM value and the current PPM value is not greater than a threshold value (464 "No"), the controller ends the search in relation to the current reference signal, and stores the current PPM value (i.e., the last PPM value that was actually used for training the adaptive filter) as the best value for the selected reference signal. As an alternative, depending on search strategy, the controller 104 may compare the ERLE for the last two or three PPM values, and select and store the PPM value that produced the best ERLE value.

As in FIG. 3, the controller 104 then determines (368) whether there is another reference signal remaining to be test, and if so (368 "Yes"), selects (150) the next reference signal and repeats storing (134) the reference signal in the buffer, etc. When all of the reference signals have been tested (368 "No"), the controller 104 uses (372) the best PPM value found for each reference signal to correct the frequency offset when cancelling acoustic echo.

While the processes illustrated in FIGS. 1, 3 and 4 determine the best add/drop rate for a reference signal before transmitting/testing the next reference signal, an alternative is to transmit and buffer each of the reference signals in succession (one after another), buffering each signal $x_z$ 112 and the corresponding signal y 120 captured by the microphone. Thereafter, once the data is stored for testing all of the reference signals, the controller 104 determines the best PPM value for each reference signal. An advantage of such an approach is it shortens the amount of time needed from a listener's perspective to cycle through all of the speakers 114. A minor disadvantage is it increases the amount of memory storage needed for buffers 160 and 162, since samples need to be stored at a same time for all of the reference signals (which in most contemporary audio systems, is a trivial amount of storage).

After the frequency offset PPM value is determined for each of the M reference signals, the controller 104 may continue monitoring frequency offset. Crystal oscillators of the system 100 will be relatively stable, such that there should be no big changes (e.g., tens of ppm) in a short period of time. Small estimation errors such as a change of 3 ppm will not significantly decrease performance of the AEC 102.

After measuring the frequency offsets df1, df2, . . . dfM of the loudspeakers and microphone in accordance with the process in FIGS. 1, 3, and 4, an add drop method may be used for each reference signal $x_z$ 112 to make frequency corrections. One sample will be added or dropped from each reference signal in 1/dfk samples. For each microphone and for each AEC (for each loudspeaker), the controller 104 monitors the peak position of the impulse response for each AEC 102. Any method of determining the peak position of the impulse response may be used, as known in the art.

An example would be monitoring loudspeaker 114a peak position and using a microphone array that includes 8 microphones 118a to 118h. Each microphone has an AEC impulse response 1 (ImpRes1) corresponding to the loudspeaker 114a. Hence, there are 8 ImpRes1 (one per microphone) corresponding to loudspeaker 114a. If there is a change in frequency offset between loudspeaker 114a and the microphones, then the peak position of 8 ImpRes1 will be moved in the samples of the signals $y_1$ 120a to $y_8$ 120h in the same amount. The amount of samples of peak position movement will correspond to frequency-offset correction. If the peak position changes, the change is related to frequency offset and the peak position will continue movement for a while in the same direction. That fact may be used to determine the frequency offset change condition.

If the ImpRes1 peak position is random for the eight microphones 118a-118h, then the change of peak position does not relate to frequency offset changes. The peak may be changed because an echo path may change or the room reverberation changes. In that cases no action will be taken to correct frequency offset.

Figure 5:
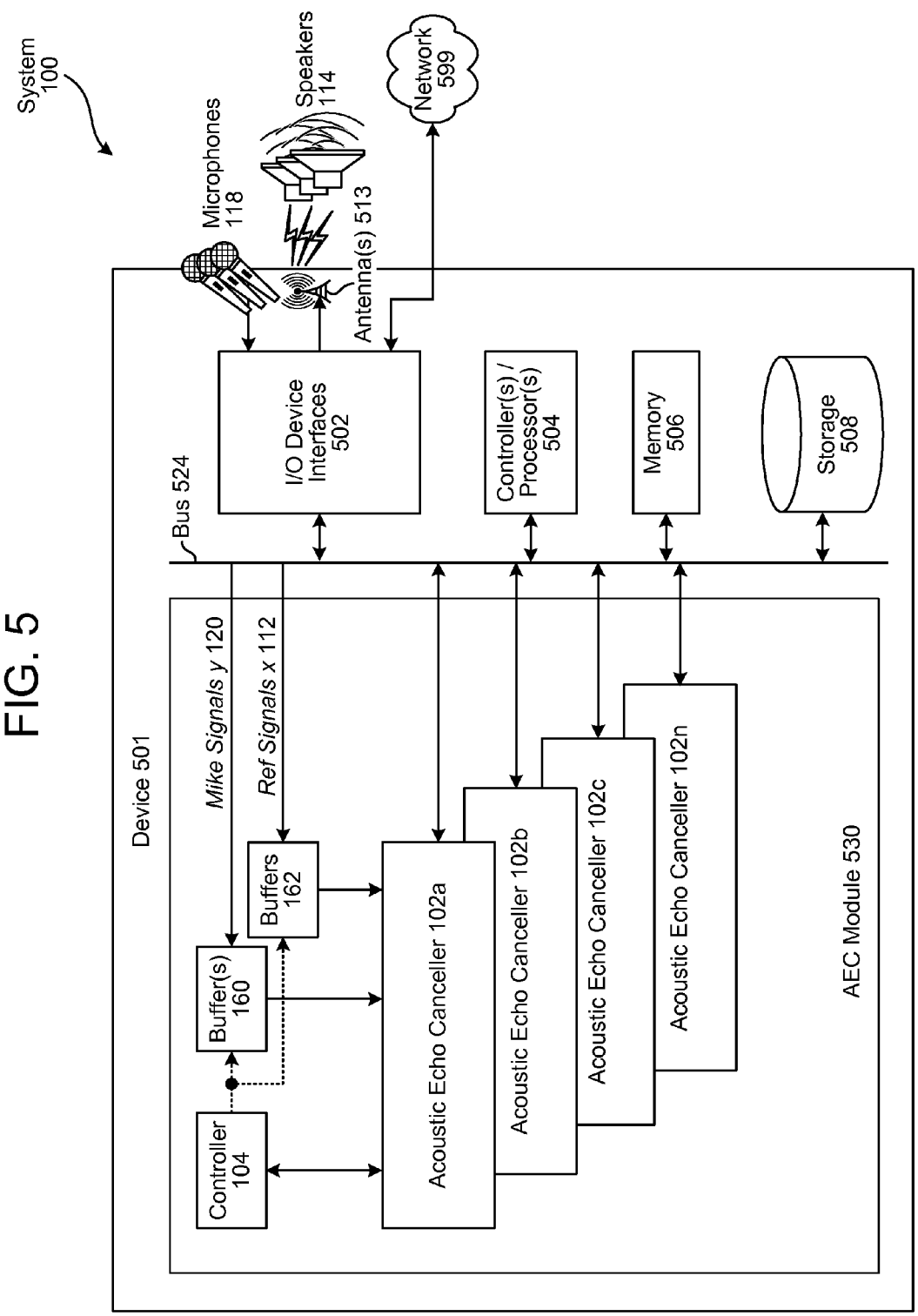
FIG. 5 is a block diagram conceptually illustrating example components of a system for echo cancellation.

FIG. 5 is a block diagram conceptually illustrating example components of the system 100. In operation, the system 100 may include computer-readable and computer-executable instructions that reside on the device 501, as will be discussed further below.

The system 100 may include one or more audio capture device(s), such as a microphone or an array of microphones 118. The audio capture device(s) may be integrated into the device 501 or may be separate.

The system 100 may also include an audio output device for producing sound, such as speaker(s) 116. The audio output device may be integrated into the device 501 or may be separate. However, for the frequency offset correction to be useful, the clocking of one or both of the audio capture device(s) and audio output devices will be different, which ordinarily means one or both will be separate. A contemplated arrangement is to use the system 100 with wireless speakers 114, such that the speakers 114 will be separate from the device 501, The device 501 may include an address/data bus 524 for conveying data among components of the device 501. Each component within the device 501 may also be directly connected to other components in addition to (or instead of) being connected to other components across the bus 524.

The device 501 may include one or more controllers/processors 504, that may each include a central processing unit (CPU) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The device 501 may also include a data storage component 508, for storing data and controller/processor-executable instructions (e.g., instructions to perform the algorithms illustrated in FIGS. 1, 4, and 9). The data storage component 508 may include one or more non-volatile storage types such as magnetic storage, optical storage, solid-state storage, etc. The device 501 may also be connected to removable or external non-volatile memory and/or storage (such as a removable memory card, memory key drive, networked storage, etc.) through the input/output device interfaces 502.

Computer instructions for operating the device 501 and its various components may be executed by the controller(s)/processor(s) 504, using the memory 506 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The device 501 includes input/output device interfaces 502. A variety of components may be connected through the input/output device interfaces 502, such as the speaker(s) 114, the microphones 118, and a media source such as a digital media player (not illustrated). The input/output interfaces 502 may include A/D converters for converting the output of microphone 118 into signals y 120, if the microphones 118 are integrated with or hardwired directly to device 501. If the microphones are independent, the A/D converters will be included with the microphones, and may be clocked independent of the clocking of the device 501. Likewise, the input/output interfaces 502 may include D/A converters for converting the reference signals x 112 into an analog current to drive the speakers 114, if the speakers are integrated with or hardwired to the device 501. However, if the speakers are independent, the D/A converters will be included with the speakers, and may be clocked independent of the clocking of the device 501 (e.g., conventional Bluetooth speakers).

The input/output device interfaces 502 may also include an interface for an external peripheral device connection such as universal serial bus (USB), FireWire, Thunderbolt or other connection protocol. The input/output device interfaces 502 may also include a connection to one or more networks 599 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc, and associated antenna(s) 513. Non-radio wireless protocols may also be supported, such as use of infrared communications. Through the network 599, the system 100 may be distributed across a networked environment.

The device 501 further includes an AEC module 530 that includes the controller 104, the buffers 160 and 162, and the individual AEC 102, where there is an AEC 102 for each microphone 118.

Multiple devices 501 may be employed in a single system 100. In such a multi-device system, each of the devices 501 may include different components for performing different aspects of the AEC process. The multiple devices may include overlapping components. The components of device 501 as illustrated in FIG. 4 are exemplary, and may be a stand-alone device or may be included, in whole or in part, as a component of a larger device or system. For example, in certain system configurations, one device may transmit and receive the audio data, another device may process the buffered data to determine the frequency offsets, another device may perform AEC, and yet another device my use the error signals e 126 (audio out 128) for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the AEC module 530 may be implemented by a digital signal processor (DSP). The controller 104 may also be implemented as a state machine.

As used in this disclosure, the term "a" or "one" may include one or more items unless specifically stated otherwise. Further, the phrase "based on" is intended to mean "based at least in part on" unless specifically stated otherwise.

What is claimed is:
1. A method, comprising:
transmitting an audio reference signal that has a first sampling rate to a wireless speaker;
storing samples of the audio reference signal at the first sampling rate;

outputting audible sound from the wireless speaker at a second sampling rate;
receiving a first signal from a microphone, the first signal including a portion of the audible sound;
storing the first signal;
determining a first normalized ratio between the first sampling rate and the second sampling rate, the first normalized ratio representing a first potential offset between the first sampling rate and the second sampling rate;
reproducing, as a first filter input signal, the stored samples of the audio reference signal, adding a first duplicate of one sample per a reciprocal of the first normalized ratio;
reproducing the first signal from storage as a first reproduced signal;
subtracting a first filtered signal output from the adaptive filter, based on the first filter input signal, from the first reproduced signal as a first output signal;
causing filter coefficients of the adaptive filter to converge based on the first output signal;
determining a first echo-return loss enhancement (ERLE) value for the adaptive filter after the filter converges based on the first output signal, the first ERLE value quantifying cancellation of the portion of the audible sound from the first reproduced signal;
determining a second normalized ratio between the first sampling rate and the second sampling rate that is different than the first normalize ratio, the second normalized ratio representing a second potential offset between the first sampling rate and the second sampling rate;
reproducing, as a second filter input signal, the stored samples of the audio reference signal, adding a second duplicate of one sample per a reciprocal of the second normalized ratio;
subtracting a second filtered signal output from the adaptive filter, based on the second filter input signal, from the first reproduced signal as a second output signal;
causing filter coefficients of the adaptive filter to converge based on the second output signal;
determining a second ERLE value for the adaptive filter after the filter converges based on the second output signal, the second ERLE value quantifying cancellation of the portion of the audible sound from the first reproduced signal;
determining that the second ERLE value is greater than the first ERLE value; and
selecting the second normalized ratio to correct offset between the first sampling rate and the second sampling rate.

2. The method of claim 1, wherein the second normalized ratio is selected based in part on the first ERLE value in accordance with a search strategy.

3. A computing device comprising:
a processor;
a first oscillator that produces a first clock signal, the processor to use the first clock signal to control timing of operations of the processor;
a memory including instruction operable to be executed by a processor that configure the processor to:
transmit a first audio reference signal to a first sound reproduction device, the first sound reproduction device associated with a second clock signal that controls sound reproduction by the first sound reproduction device, the second clock signal being independent of the first clock signal;
receive a first signal from a microphone, the first signal including a first portion of the first audio reference signal;
determine a first normalized ratio between the first clock signal and the second clock signal, the first normalized ratio representing a first potential offset between the first clock signal and the second clock signal;
generate, using a first adaptive filter and based on the first audio reference signal, a first output signal;
determine a first echo-return loss enhancement (ERLE) value for the first adaptive filter after the first adaptive filter converges based on the first output signal;
determine a second normalized ratio between the first clock signal and the second clock signal, the second normalized ratio representing a second potential offset between the first clock signal and the second clock signal that is different than the first potential offset;
generate, using the first adaptive filter and based on the first audio reference signal, a second output signal;
determine a second ERLE value for the adaptive filter after the first adaptive filter converges based on the second output signal;
determine that the second ERLE value is greater than the first ERLE value; and
select the second normalized ratio to correct offset between the first clock signal and the second clock signal.

4. The computing device of claim 3, wherein:
the instructions to generate the first output signal configure the processor to:
input first samples of the first audio reference signal into the first adaptive filter, adding a first duplicate of one sample per a reciprocal of the first normalized ratio,
subtract a first filtered output of the first adaptive filter, based on the first samples, from the first signal, to generate the first output signal, and
cause filter coefficients of the first adaptive filter to converge based on the first output signal; and
the instructions to generate the second output signal configure the processor to:
input second samples of the first audio reference signal into the first adaptive filter, adding a second duplicate of one sample per a reciprocal of the second normalized ratio,
subtract a second filtered output of the first adaptive filter, based on the second samples, from the first signal, to generate the second output signal, and
cause filter coefficients of the first adaptive filter to converge based on the second output signal.

5. The computing device of claim 3, wherein:
the instructions to generate the first output signal configure the processor to:
input first samples of the first audio reference signal into the first adaptive filter, dropping one sample per a reciprocal of the first normalized ratio,
subtract a first filtered output of the first adaptive filter, based on the first samples, from the first signal, to generate the first output signal, and
cause filter coefficients of the first adaptive filter to converge based on the first output signal; and the instructions to generate the second output signal configure the processor to:
input second samples of the first audio reference signal into the first adaptive filter, dropping one sample per a reciprocal of the second normalized ratio,
subtract a second filtered output of the first adaptive filter, based on the second samples, from the first signal, to generate the second output signal, and
cause filter coefficients of the first adaptive filter to converge based on the second output signal.

6. The computing device of claim 3, wherein the instructions further configure the processor to:
determine that the first adaptive filter has converged based on the first output signal at a first end of a first duration of time; and
determine that the first adaptive filter has converged based on the second output signal at a second end of the first duration of time.

7. The computing device of claim 3, wherein the instructions further configure the processor to:
determine that the first adaptive filter has converged based on the first output signal when the first output signal stabilizes to a first approximately steady state value; and
determine that the first adaptive filter has converged based on the second output signal when the second output signal stabilizes to a second approximately steady state value.

8. The computing device of claim 3, wherein the instructions to determine the second normalized ratio determine the second normalized ratio based on the first ERLE value, and the instructions further configure the processor to:
determine a third normalized ratio based on the second ERLE value; and
determine that an absolute value of a difference between the second normalized ratio and the third normalized ratio is less than a threshold value,
wherein the second normalized ratio is selected to correct the offset in response to the absolute value being less than the threshold value.

9. The computing device of claim 3, wherein the instructions further configure the processor to:
determine each of a plurality of normalized ratios based on a predefined step size between consecutive normalize ratios, the plurality of normalized ratios including the first normalized ratio and the second normalized ratio; and
determine ERLE values for each of the plurality of normalized ratios, prior to the second normalized ratio being selected to correct the offset.

10. The computing device of claim 3, wherein the instructions further configure the processor to:
transmit a second audio reference signal to the first sound reproduction device;
receive a second signal from the microphone, the second signal including a second portion of the second audio signal;
input samples of the second audio reference signal into the first adaptive filter, adding to or dropping the samples in accordance with the second normalized ratio to correct the offset, the processor to:
add a duplicate of one sample per a reciprocal of the second normalized ratio in response to the second normalized ratio being greater than zero; and
drop one sample per the reciprocal of the second normalized ratio in response to the second normalized ratio being less than zero; and
remove the second portion of the second audio signal from the second signal.

11. The computing device of claim 10, wherein the instructions further configure the processor to:
determine a first peak position of an impulse response of the first adaptive filter;
determine a second peak position of the impulse response of the first adaptive filter, after the first peak position;
determine a difference between the first peak position and the second peak position; and
increase the second normalized ratio based on the difference to adjust for an increase in the offset between the first clock signal and the second clock signal.

12. A method performed by a computing device, comprising:
controlling timing operations of the computing device based on a first clock signal;
transmitting a first audio reference signal from the computing device to a first sound reproduction device, the first sound reproduction device associated with a second clock signal that controls sound reproduction by the first sound reproduction device, the second clock signal being independent of the first clock signal;
receiving a first signal from a microphone, the first signal including a first portion of the first audio reference signal;
determining a first normalized ratio between the first clock signal and the second clock signal, the first normalized ratio representing a first potential offset between the first clock signal and the second clock signal;
generating, using a first adaptive filter and based on the first audio reference signal, a first output signal;
determining a first echo-return loss enhancement (ERLE) value for the first adaptive filter after the first adaptive filter converges based on the first output signal;
determining a second normalized ratio between the first clock signal and the second clock signal, the second normalized ratio representing a second potential offset between the first clock signal and the second clock signal that is different than the first potential offset;
generating, using the first adaptive filter and based on the first audio reference signal, a second output signal;
determining a second ERLE value for the adaptive filter after the first adaptive filter converges based on the second output signal;
determining that the second ERLE value is greater than the first ERLE value; and
selecting the second normalized ratio to correct offset between the first clock signal and the second clock signal.

13. The method of claim 12, wherein:
the generating of the first output signal comprises:
inputting first samples of the first audio reference signal into the first adaptive filter, adding a first duplicate of one sample per a reciprocal of the first normalized ratio,
subtracting a first filtered output of the first adaptive filter, based on the first samples, from the first signal, to generate the first output signal, and
causing filter coefficients of the first adaptive filter to converge based on the first output signal; and
the generating of the second output signal comprises:
inputting second samples of the first audio reference signal into the first adaptive filter, adding a second duplicate of one sample per a reciprocal of the second normalized ratio, subtracting a second filtered output of the first adaptive filter, based on the second samples, from the first signal, to generate the second output signal, and causing filter coefficients of the first adaptive filter to converge based on the second output signal.

14. The method of claim 12, wherein:

the generating of the first output signal comprises:
inputting first samples of the first audio reference signal into the first adaptive filter, dropping one sample per a reciprocal of the first normalized ratio, subtracting a first filtered output of the first adaptive filter, based on the first samples, from the first signal, to generate the first output signal, and causing filter coefficients of the first adaptive filter to converge based on the first output signal; and the generating of the second output signal comprises:
inputting second samples of the first audio reference signal into the first adaptive filter, dropping one sample per a reciprocal of the second normalized ratio, subtracting a second filtered output of the first adaptive filter, based on the second samples, from the first signal, to generate the second output signal, and causing filter coefficients of the first adaptive filter to converge based on the second output signal.

15. The method of claim 12, further comprising:

determining that the first adaptive filter has converged based on the first output signal at a first end of a first duration of time; and determining that the first adaptive filter has converged based on the second output signal at a second end of the first duration of time.

16. The method of claim 12, further comprising:

determining that the first adaptive filter has converged based on the first output signal when the first output signal stabilizes to a first approximately steady state value; and determining that the first adaptive filter has converged based on the second output signal when the second output signal stabilizes to a second approximately steady state value.

17. The method of claim 12, wherein the determining of the second normalized ratio is based on the first ERLE value, and the method further comprises:

determining a third normalized ratio based on the second ERLE value; and determining that an absolute value of a difference between the second normalized ratio and the third normalized ratio is less than a threshold value, wherein the second normalized ratio is selected to correct the offset in response to the absolute value being less than the threshold value.

18. The method of claim 12, further comprising:

determining each of a plurality of normalized ratios based on a predefined step size between consecutive normalize ratios, the plurality of normalized ratios including the first normalized ratio and the second normalized ratio; and determining ERLE values for each of the plurality of normalized ratios, prior to the second normalized ratio being selected to correct the offset.

19. The method of claim 12, further comprising:

transmitting a second audio reference signal to the first sound reproduction device;

receiving a second signal from the microphone, the second signal including a second portion of the second audio signal;

inputting samples of the second audio reference signal into the first adaptive filter, adding to or dropping the samples in accordance with the second normalized ratio to correct the offset, including:

adding a duplicate of one sample per a reciprocal of the second normalized ratio when the second normalized ratio selected to correct the offset is greater than zero, as selected to correct the offset; and dropping one sample per the reciprocal of the second normalized ratio when the second normalized ratio selected to correct the offset is less than zero; and removing the second portion of the second audio signal from the second signal.

20. The method of claim 19, further comprising:

determining a first peak position of an impulse response of the first adaptive filter;

determining a second peak position of the impulse response of the first adaptive filter, after the first peak position;

determining a difference between the first peak position and the second peak position; and increasing the second normalized ratio based on the difference to adjust for an increase in the offset between the first clock signal and the second clock signal.

* * * * *